UNITED STATES PATENT OFFICE.

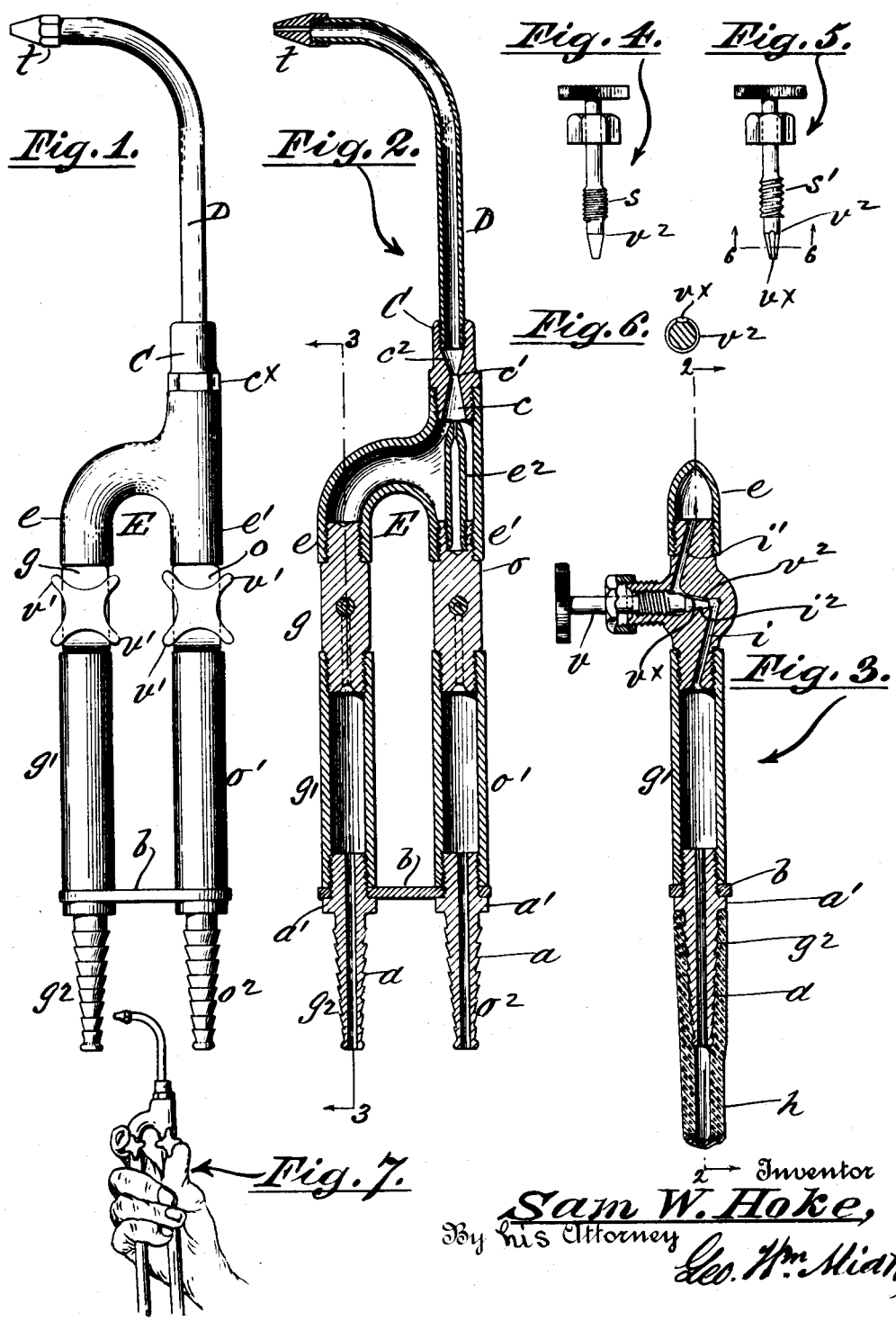

SAM W. HOKE, OF PALISADE, NEW JERSEY.

JEWELER'S TORCH.

1,384,954.     Specification of Letters Patent.     Patented July 19, 1921.

Application filed February 20, 1920. Serial No. 360,045.

*To all whom it may concern:*

Be it known that I, SAM W. HOKE, a citizen of the United States, and a resident of Palisade, Bergen county, State of New Jersey, have invented certain new and useful Improvements in Jewelers' Torches, of which the following is a specification.

My improvements relate to the "torches," so called used by jewelers in soldering, brazing and welding and similar operations, and are designed to afford a simple, convenient and efficient appliance of the character designated, that may be manipulated with facility and accuracy,—and by which the gaseous admixture may be regulated and controlled effectually and instantaneously in accordance with the varying requirements and exigencies of use,—the invention consisting in the specific construction, combination and arrangement of parts described and claimed, distinctive features relating to the ejector and valve actuation, the assembling of parts, the means of gas conduit attachment, etc., all as hereinafter fully set forth.

In the accompanying drawings,

Figure 1, is a front elevation of my improved torch;

Fig. 2, is a central longitudinal section thereof;

Fig. 3, is a section taken upon plane of line 3—3, Fig. 2;

Fig. 4, is an elevation in detail of the "oxygen" valve stem;

Fig. 5, is an elevation in detail of the "gas" valve stem;

Fig. 6, is a section taken upon plane of line 6—6, of Fig. 5, on an enlarged scale.

Fig. 7, is a view illustrating the method of manipulating the valves which control the supply of gas and oxygen to the ejector.

E may be designated as the bifistulous ejector section of my improved torch, said ejector section being provided with a constrictive nozzle C, of peculiar construction interposed betwen it and the discharge spout D. To the outer end of the lateral duct $e$, of said bifistulous ejector section E, is screwed one end of the gas valve casing $g$, and into the other duct $e'$ in alinement with the constrictive nozzle C, is screwed one end of the oxygen valve casing $o$, as shown more particularly in Fig. 2, of the drawings, by reference to which it will also be seen that the other extremities of said valve casings $g$, $o$, are screw-connected respectively with the inner ends of coupling pipes $g'$, $o'$, the outer extremities of which are in turn screw-connected with the nipples $g^2$, $o^2$, provided for the attachment of the flexible rubber hose $h$, (Fig. 3,) by means of which communication is had with the supply sources of fuel gas, and of oxygen gas,—the latter under relatively high pressure as compared with the fuel gas.

It may be stated in this connection that my improved torch is designed for use with oxygen under pressure of, say from one half to ten pounds, and with any fuel gas, natural or artificial, hydrocarbon, hydrogen or acetylene, at relatively low pressure, such for instance as that of ordinary illuminating gas supply.

In order to attain a secure attachment of the rubber tube gas conduits with my torch without resort to binding wires, clamps or other extraneous appliances, which are inconvenient and objectionable for many reasons as related to a hand implement of this character, I make my hose nipples $g^2$, $o^2$, of tapering conoidal configuration, and form them peripherally with barb-like corrugations $a$, inclined rearward toward an annular base shoulder $a'$, in each case, so as to present a minimum of resistance to insertion within the ends of the rubber hose, while affording a maximum of resistance to removal therefrom, the barbed corrugations embedding themselves in the stretched and expanded rubber tubing as illustrated in Fig. 3, and thereby effecting a substantially positive conjunction between torch and hose connections, sufficient for all practical purposes involved in the usual handling and manipulation of the device.

The annular base shoulder $a'$, on each nipple $g^2$, $o^2$, functions not only as an abutment for the end of the hose $h$, but also as a rest and support for a bridge plate $b$, interposed between the nipples $g^2$, $o^2$, and the outer ends of the coupling tubes $g'$, $o'$,—the ends of said bridge piece $b$, being perforated for the insertion of the threaded base ends of said nipples $g^2$, $o^2$, so that the screwing home of the latter secures the bridge piece $b$, rigidly in position, as will be understood by reference more particularly to Fig. 2, of the drawings. Thus the bridge piece $b$, reinforces and stiffens this end of the structure, and incidentally affords a finger rest which facilitates hand manipulation, as in Fig. 7, in which the little finger of the right hand is presumably resting upon and pressed against said bridge piece $b$.

This Fig. 7, also illustrates the finger and thumb manipulation and control of the needle valves which regulate the gas and oxygen supply to the ejector section E, and to facilitate this method of valve actuation the valve stems $v$, are preferably formed at their outer extremities with radially protuberant finger rests $v'$, $v'$, as shown more particularly in Fig. 1. By this means the valve stems $v$, may be instantly and conveniently, and positively turned the fraction of a rotation with accuracy, which is an important factor adapting the torch to expeditious adjustment to the varying requirements and exigencies of jewelry factory work.

For this reason also I use needle valves in preference to any other kind, as they are more sensitive and quickly responsive in effecting the regulation of flow to the ejector chamber.

Fig. 3, shows the casing of one of these valves in central longitudinal section, by reference to which it will be seen that the inlet duct $i$, and the outlet duct $i'$, are inclined with relation to the valve seat $i^2$, which is, of course transversely positioned and conoidal to conform to the conoidal valve $v^2$, forming the inner end of the valve stem $v$. Both valves are essentially the same in construction and operation except that the valve stem (shown in detail in Fig. 4) for the oxygen controlling valve is formed with a relative fine screw thread $s$, of slight pitch, while the valve stem for the fuel gas control (shown in detail in Fig. 5) is made with a coarser screw thread $s'$, of much steeper pitch, and also with a leak space $v^x$, which latter, when the valve is seated, allows sufficient gas to pass to sustain a pilot flame to obviate the need of relighting the torch after a temporary suspension of use.

The coarser and steeper pitch of the screw $s'$, of the fuel gas control valve stem enables me, by an approximate quarter turn thereof, or less, to quickly augment or reduce the supply of fuel gas to the ejector chamber, according to requirements, whereas the slower responsive action of the oxygen supply valve stem tends to prevent the blowing out of the flame by an excess of oxygen.

The latter is delivered to the constrictive nozzle C, through the jet pipe $e^2$, which projects the stream of oxygen under pressure into the opposed end of the convergent constrictor passage $c$, which passage $c$, is formed with the contracted medial port $c'$, opening into the outward flare $c^2$, with which the discharge spout D, communicates, as shown in Fig. 2. The stream of oxygen thus forcefully propelled through the jet $e^2$, into the relatively wide funnel shaped mouth $c$, of the constrictive nozzle C, acts as an inductive vehicle to carry the fuel gas with it through the passage $c$, $c'$, and $c^2$, as considered in a unitary sense, and to deliver the admixture under pressure to the discharge spout D, by which it is conducted to the burner tip $t$,—the force of this oxygen vehicle stream, combined with the narrowness of the medial port $c'$, effectually counteracting any possible back pressure, and insuring continuous delivery to the flame.

It is to be noted that the constrictive nozzle C, is screw-connected with the ejector section E; and it is formed externally for contactual engagement with a wrench or other mechanical expedient whereby it may be conveniently loosened or tightened in position. Thus in Fig. 1, of the drawings it is shown as formed for this purpose with a hexagonal wrench bearing portion $c^x$, although I do not limit myself to this identical structure, the essential feature in this respect being the formation of the constrictive nozzle C, in such manner that it may be readily unscrewed and detached for cleansing purposes, and as readily replaced.

In fact one of the distinctive features of my whole contrivance is that practically all the component parts thereof are readily detachable, and readily assembled, so that the whole device may be kept clean and in good operative condition, or replacement of parts conveniently effected, as may be found expedient.

The detachable securing of the constrictive nozzle C, to the ejector section E, is of especial importance in that it affords ready access to the oxygen jet $e^2$, for the purpose of clearing the relatively narrow outlet thereof in case of clogging, as by gas precipitates.

Another important advantage attained by my improved construction of jewelers' torch, is the ease with which the flame may be varied and regulated to suit the requirements and character of the work to be done. Thus, by a slight movement of thumb or index finger of the hand manipulating the implement, or of both finger and thumb, the relative proportions of fuel gas and oxygen may immediately be changed, as desired, by the adjustment of the valves without change of hold, or resort to other aid. This quick adaptability to the varying requirements of practical use is an important economic factor in jewelry factories, where high priced skilled labor is indispensable. Furthermore, the accuracy and scope of adjustment of flame afforded, both as to character and pressure adapt my appliance, in the hands of an expert workman, to an extended field of work and utility,—as for instance, from the use of a relatively soft "brush" flame for dainty and delicate operations to the production of welding or melting heat, as required; all of which may be accomplished by simple finger manipulation of the control valves by the hand in which the implement is held.

It is to be understood that by the term "oxygen" as used herein, I include atmospheric oxygen, since air under pressure may be used in connection with the fuel gas in case of necessity or preference.

What I claim and desire to secure by Letters Patent is:—

1. In a jeweler's torch of the character designated, in combination, a bifistulous ejector section, a needle valve controlling the admission of fuel gas thereto, a needle valve controlling the admission of oxygen thereto, the stem of the fuel gas control needle valve being formed with a screw thread of steeper pitch than that on the stem of the oxygen control needle valve, both valve stems being formed with radially protuberant finger rests, a constrictive nozzle connected with said ejector section and formed with a convergently contracted discharge port, and an oxygen jet in alinement with said convergently contracted discharge port and communicating with said oxygen controlling valve, for the purpose described.

SAM W. HOKE.

Witnesses:
DOROTHY MIATT,
GEO. WM. MIATT.